Patented Oct. 24, 1933

1,932,125

UNITED STATES PATENT OFFICE 1,932,125

COFFEEPOT

Elizabeth Woodward, Chicago, Ill.

Application August 12, 1932. Serial No. 628,571

6 Claims. (Cl. 53—3)

This invention relates to improvements in coffee pots and, more especially, to such a device especially adapted for containing hot coffee, tea, or the like, with means for retaining one or more slices of toast in contact therewith to keep said toast warm.

The invention is especially applicable to coffee pots, and the like, used for serving hot beverages on trays, where it is customary to serve with the drink one or more slices of toast. Where such tray service is employed, for example, in hotels, hospitals, sanitariums, and the like, the tray is frequently carried a considerable distance, and often stands for some time before the recipient is ready to partake of the food. In such cases, difficulty has been encountered in keeping the toast warm. In the practice of my invention, this difficulty is overcome, as hereinafter pointed out.

Other features and advantages of my invention will appear more fully as I proceed with my specification.

In that form of device embodying the features of my invention shown in the accompanying drawing—

Figure 1 is a view in rear elevation; Fig. 2 is a view in side elevation; and Fig. 3 is a view taken as indicated by the line 3 of Fig. 1.

As shown in the drawing, the coffee pot 10 is provided with a plurality (here shown as four) of flattened side faces 10$^a$ preferably slanting inwardly somewhat. In other words, the coffee pot here shown is in the shape of a truncated pyramid. The front face is provided with the usual spout 11 and one of the side faces, with the customary handle 12.

The rear face and the side face opposite the handle 12 are each provided with means for holding a slice of toast in contact therewith to keep the same warm when the coffee pot contains a hot beverage. Since the construction of such means in conjunction with each of these faces is the same, it is necessary to describe but one in detail.

13 indicates the bottom of the coffee pot. At each side where the toast is to be supported there is provided a shelf 13$^a$ adjacent the bottom. As here shown, this shelf is an extension of the bottom itself. Hingedly attached to the outer edge of the shelf 13$^a$ by the hinge 14 is a vertically arranged clamping member or gate 15, here shown as made of sheet metal, with vertical slots or openings 15$^a$ cut therein to leave the vertical bars 15$^b$. A spiral spring 16 yieldingly urges the upper edge of the gate 15 toward the coffee pot so that the upper edge of the gate can be swung outwardly against the tension of the spring and a slice of toast 17 inserted between the gate and the face 10$^a$ of the coffee pot. When the gate is released, it will hold the slice of toast supported on the shelf 13$^a$ in contact with the hot face 10$^a$ of the coffee pot, thus keeping the toast warm.

While I have shown and described a certain embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In combination with a coffee pot, the liquid retaining wall of which has a flattened face, means attached to the coffee pot for holding a slice of toast in contact with said face.

2. A coffee pot as claimed in claim 1 in which the means for holding the slice of toast in contact with the flattened face includes a spring clamping member.

3. A coffee pot having a bottom and liquid retaining side wall, said side wall having a flattened face, a shelf adjacent the bottom projecting outwardly beyond said face, and means for holding a slice of toast on said shelf in contact with said face.

4. A coffee pot as claimed in claim 3 in which the means for holding the slice of toast in contact with the face includes a spring clamping member.

5. A coffee pot as claimed in claim 3 in which the means for holding the slice of toast in contact with the face includes a spring clamping member hingedly attached to the outer edge of the shelf.

6. A coffee pot as claimed in claim 3 in which the said shelf is an extension of the bottom of the coffee pot.

ELIZABETH WOODWARD.

Oct. 24, 1933.　　　　　G. W. ALLEN　　　　　1,932,126
MOUNTING FOR TUBULAR HANDLES
Filed May 19, 1930
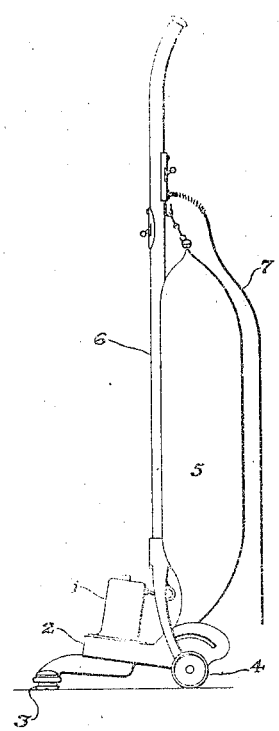
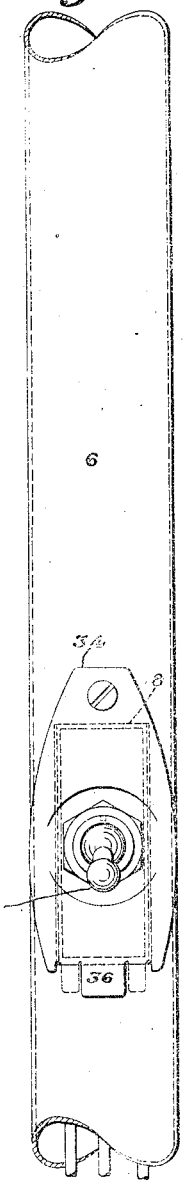
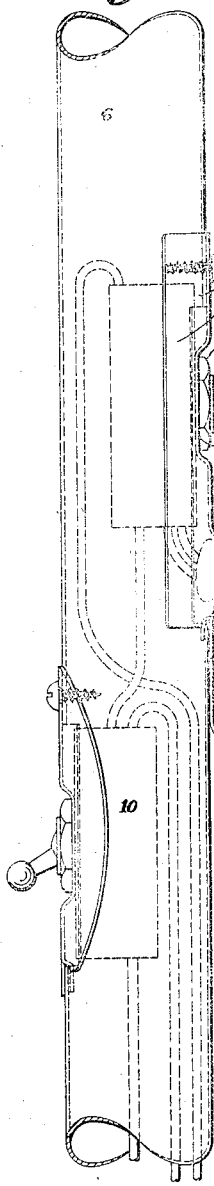
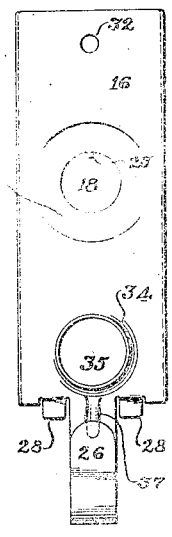
Witness
Paul F. Bryant
Inventor
George W. Allen
by his attorneys
Van Everen, Fish, Hildreth, + Cary